US008542837B2

(12) United States Patent
Andersson et al.

(10) Patent No.: US 8,542,837 B2
(45) Date of Patent: Sep. 24, 2013

(54) KEY SELECTION VECTOR, MOBILE DEVICE AND METHOD FOR PROCESSING THE KEY SELECTION VECTOR, DIGITAL CONTENT OUTPUT DEVICE, AND REVOCATION LIST

(75) Inventors: Stefan Andersson, Lund (SE); Per Gunnar Tobias Melin, Harlosa (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1038 days.

(21) Appl. No.: 12/390,817

(22) Filed: Feb. 23, 2009

(65) Prior Publication Data

US 2010/0215178 A1    Aug. 26, 2010

(51) Int. Cl.
*H04L 29/06* (2006.01)
(52) U.S. Cl.
USPC ........... 380/277; 713/150; 713/158; 713/160; 713/171
(58) Field of Classification Search
USPC ....................................................... 380/277
See application file for complete search history.

(56) References Cited

U.S. PATENT DOCUMENTS

| 7,788,727 | B2 | 8/2010 | Shintani | |
|---|---|---|---|---|
| 2004/0098579 | A1* | 5/2004 | Nakano et al. | 713/150 |
| 2004/0205345 | A1* | 10/2004 | Ripley et al. | 713/176 |
| 2005/0066356 | A1* | 3/2005 | Stone et al. | 725/31 |
| 2005/0069130 | A1* | 3/2005 | Kobayashi | 380/201 |
| 2005/0144468 | A1* | 6/2005 | Northcutt et al. | 713/189 |
| 2006/0047957 | A1* | 3/2006 | Helms et al. | 713/165 |
| 2006/0101524 | A1* | 5/2006 | Weber | 726/27 |
| 2006/0171391 | A1* | 8/2006 | Suzuki | 370/392 |
| 2007/0098179 | A1* | 5/2007 | Nave | 380/286 |
| 2008/0092246 | A1* | 4/2008 | Shintani | 726/30 |
| 2008/0127312 | A1* | 5/2008 | Iwamoto et al. | 726/4 |
| 2008/0134237 | A1* | 6/2008 | Tu et al. | 725/38 |
| 2008/0172708 | A1* | 7/2008 | Perry et al. | 725/110 |

FOREIGN PATENT DOCUMENTS

| EP | 1617332 A1 | 1/2006 |
|---|---|---|
| WO | 2008022301 A2 | 2/2008 |

OTHER PUBLICATIONS

Staring et al., Revocation in the video content protection system, Jan. 2006, 2006 Digest of Technical Papers International Conference on Consumer Electronics, pp. 105-106.*

(Continued)

*Primary Examiner* — Taghi Arani
*Assistant Examiner* — Kenneth Chang
(74) *Attorney, Agent, or Firm* — Renner, Otto, Boisselle & Sklar, LLP

(57) ABSTRACT

A key selection vector for a revocation list in an HDCP system as well as a mobile device and a method for processing a key selection vector, a digital content output device using a key selection vector and a revocation list for use in an HDCP system comprising a key selection vector are described. It is desired to improve handling of key selection vectors of revocation lists. A structured key selection vector for a revocation list is provided. The key selection vector is structured to contain at least one bit field with a predetermined number of bits and at a predetermined location in the key selection vector. The bit field contains information relating to a group property of a device, which group property allows to process as a group a plurality of key selection vectors storing the same or similar group property information in said at least one bit field.

15 Claims, 6 Drawing Sheets

(56) References Cited

OTHER PUBLICATIONS

Anonymous: "IEEE Standard for Local and Metropolitan Area Networks: Overview and Architecture"/ IEEE Standard; Piscataway, NJ, USA, Jan. 1, 2002, pp. 1-36, XP017601030, p. 9, line 12—p. 20, line 12.
International Search Report, corresponding to PCT/EP2009/060784, mailed Jan. 7, 2010.
Written Opinion of he International Searching Authority, corresponding to PCT/EP2009/060784, mailed Jan. 7, 2010.
International Preliminary Report on Patentability, corresponding to PCT/EP2009/060784, date of completion Mar. 25, 2011.
www.hdmi.org 1.0, 1.2, 1.3 and 1.3a published by HDMI Licensing, LLC, Nov. 10, 2006.
"High-Bandwidth Digital Content Protection System," Revision 1.3 of Dec. 21, 2006 published by the Digital Content Protection LLC.

* cited by examiner

US 8,542,837 B2

KEY SELECTION VECTOR, MOBILE DEVICE AND METHOD FOR PROCESSING THE KEY SELECTION VECTOR, DIGITAL CONTENT OUTPUT DEVICE, AND REVOCATION LIST

FIELD OF THE INVENTION

The present invention relates to a key selection vector for a revocation list in an HDCP system as well as to a mobile device and a method for processing a key selection vector, a digital content output device using a key selection vector and a revocation list for use in an HDCP system comprising a key selection vector.

BACKGROUND

High-Definition Multimedia Interface (HDMI) is an audio and/or video interface for providing digital content. Previously, several analog interfaces have been described for transmitting analog data from a reproducing device, which will be called a source device in the following, to an output device, which will be called a sink device in the following. For example, SCART interfaces have been used to connect between a video cassette recorder or DVD player and an output display, such as a television set.

HDMI connects digital audio/video source devices, such as set-top boxes, Blu-ray players, personal computers and gaming consoles to sink devices, such as audio equipment and liquid crystal display (LCD) devices, e.g. flat-screen TVs. HDMI supports several video and audio formats so that digital audio and visual content can be transmitted in digital form from a source device to a sink device with basically no deterioration in the transmitted information. HDMI devices comprising source devices and sink devices are manufactured to adhere to the HDMI specifications. Several versions of the HDMI specifications exist, such as 1.0, 1.2, 1.3 and 1.3a, which are published by HDMI Licensing, LLC and may be retrieved from their website www.hdmi.org. All these specifications are hereby incorporated by reference.

Since digital audio/visual content is transmitted from a source device to a sink device, a manipulation of the connection, i.e. at or between the devices, has to be prevented so that digital content may not be copied by an unauthorized third party. Hence, the transmitted content is encrypted by high-bandwidth digital content protection (HDCP), for example. HDCP is an encryption system for protected transmission of digital content developed for HDMI. The HDCP specification "High-Bandwidth Digital Content Protection System", Revision 1.3 of Dec. 21, 2006 published by the Digital Content Protection LLC is hereby incorporated by reference.

An HDCP device that is permitted access to HDCP content is referred to as an authorized device. An HDCP source device may test if a connected HDCP sink device is an authorized device by successfully completing an authentication protocol defined in the above referenced HDCP specification. In HDCP, different device private keys are used for security in an HDCP device and a unique key selection vector (KSV) is provided as a non-secret unique identifier of the HDCP device associated with the device private keys. It is contemplated that an authorized device in the authentication protocol may become compromised so as to expose the device private keys it possesses for misuse by unauthorized parties. If it is determined that the device private keys have been compromised, the corresponding KSV of that device is placed on a revocation list that the HDCP source device checks during authentication. Other authorized HDCP sink devices are not affected by this revocation because they have different sets of device private keys and different associated KSVs. The HDCP source device is required to manage system renewability messages (SRMs) carrying the revocation list including KSVs.

Currently, revocation lists are used on Blu-ray discs. At least one revocation list is stored on a Blu-ray disc and is provided to the HDCP source device when the disc is read by the HDCP source device.

It is desired that HDMI can also be integrated in mobile devices, such as mobile phones or other small portable devices with preferably a radio interface, such as a netbook. However, HDCP is required for protection of the digital content processed and transmitted.

Revocation lists in a HDCP system may contain a large amount of data, e.g. several hundreds of KSVs corresponding to devices that became compromised or are otherwise unauthorized to output digital content. Thus, revocation lists can occupy a large amount of memory since the revocation lists to be distributed contain individual KSVs, and processing this large amount of data may be complicated, consume valuable resources, and take a long time. This can be particularly problematic due to the limited resources available in mobile devices.

For example, a mobile phone comprises a relatively small memory, which may become occupied by a large amount of data of the revocation lists. Further, when executing the authentication protocol, the HDCP source device receives the KSV of the HDCP sink device and before digital content is provided to the sink device, it has to be checked whether the KSV of the sink device is included in a revocation list.

Therefore, the processor of the mobile phone has to get involved in performing a search whether the KSV of the sink device is present in a stored revocation list or revocation lists, so that processing power has to be committed to process the search and may not be used for other important functions, such as signalling in mobile phones, for example.

Compared to a mobile phone, a Blu-ray disc player may be a more powerful device that is able to readout revocation lists from an external physical medium, the Blu-ray disc, and search revocation lists more quickly. However, in contrast to obtaining revocation lists from physical media, such as Blu-ray discs, mobile devices may need to receive revocation lists wirelessly, possibly with a quite limited data rate so that receiving one or more revocation lists may take a long time.

In summary, the size of a revocation list and/or the number of revocation lists may be large and storing and processing capabilities in mobile devices may be limited by the resources of the mobile device.

However, similar to a Blu-ray disc player, it may be desired to connect a sink device, such as an LCD TV to a mobile device, such as a mobile phone, to output digital content, such as high definition video or other media, in an HDCP system.

DISCLOSURE OF THE INVENTION

A structured key selection vector (KSV) for a revocation list in a high-bandwidth digital content protection (HDCP) system is presented. Further, a mobile device adapted to process this structured key selection vector and a method for processing this structured key selection vector are presented. Still further, a digital content output device for an HDCP system adapted to use this structured key selection vector and a revocation list for use in a HDCP system comprising this structured key selection vector are presented.

An embodiment of the invention provides a key selection vector for a revocation list in a HDCP system, wherein the key selection vector is structured to contain at least one bit field with a predetermined number of bits and at a predetermined location in the key selection vector. The bit field contains information relating to a group property of a device, which group property allows to process as a group a plurality of key selection vectors storing the same or similar group property information inside at least one bit field.

According to an advantageous example, the structured key selection vector is assigned to the group using the group property information to speed up a search for a key selection vector among a plurality of key selection vectors. Accordingly, by assigning the KSV to a group, a search for a certain KSV belonging to the group needs to be carried out on the KSVs of said group only thereby reducing the search time and processor load.

According to an advantageous example, the at least one bit field contains group property information indicating at least one of a manufacturer identity, model identity, batch identity and unit identity. Accordingly, using group property information, it is possible to assign a KSV to a group. For example, key selection vectors of devices of the same manufacturer may be grouped so that all devices of the same manufacturer may be easily and quickly found in a search.

According to an advantageous example, the key selection vector includes at least a first and a second bit field containing information relating to a first group property of a device and a second group property of the device, respectively, so as to allow processing as a group key selection vectors storing the same or similar first group property information irrespective of their second group property information and to allow processing as a sub group key selection vectors storing the same or similar first group property information in the first bit field and storing the same or similar second group property information in the second bit field. Accordingly, levels of grouping are defined, in which a group is divided into sub groups containing key selection vectors having a second bit field storing same or similar second group property information. For example, using the first and second bit fields, key selection vectors may be grouped in a tree structure so that a certain KSV in a plurality of KSVs is found more easily.

According to an advantageous example, the first bit field contains a first predetermined bit pattern relating to a predetermined first group property of a device and the second bit field contains a second predetermined bit pattern indicating that all devices of said predetermined first group property related to said first predetermined bit pattern are to be revoked in an HDCP system irrespective of their second group property information. Accordingly, a particular second predetermined bit pattern may be defined that indicates that all devices associated with the first predetermined bit pattern are to be revoked so that a single KSV with the particular second predetermined bit pattern is sufficient for revoking a plurality of different devices having key selection vectors storing different second group property information but similar or same first group property information. Therefore, the size of a revocation list may be reduced.

According to an embodiment, a mobile device is adapted to process a key selection vector for a revocation list according to one of the above described structured key selection vectors. The mobile device comprises a controller to control processing of key selection vectors in the mobile device and a memory to store key selection vectors. Accordingly, a mobile device adapted to specifically control processing of a structured key selection vector is provided that stores them according to the structure of the KSV.

According to an advantageous example, the mobile device further comprises a receiving section to receive a revocation list containing at least one key selection vector. The controller of the mobile device is adapted to determine whether the received at least one key selection vector of the revocation list is stored in the memory and to discard all data of the revocation list except the at least one key selection vector if the KSV is not stored in the memory. Accordingly, overhead data of a revocation list as well as key selection vectors received in a new revocation list but already stored in the memory, may be discarded so that the amount of data to be stored in the memory may be reduced. Therefore, content of revocation lists, i.e. previously received revocation lists and newly received revocation lists, may be merged without storing duplicates of KSVs.

According to an advantageous example, the receiving section is capable of obtaining the revocation list from at least one of a storage medium having the revocation list stored in it, a media file having the revocation list embedded in it and a firmware upgrade. Accordingly, KSVs can be provided to the mobile device.

According to an advantageous example, the controller is adapted to process as a group the plurality of key selection vectors storing the same or similar group property information in the at least one bit field. Accordingly, key selection vectors are grouped according to their group property information so that a certain KSV can be found more quickly in a search for the certain KSV.

According to an advantageous example, the controller is adapted to process as a group key selection vectors storing the same or similar first group property information in a first bit field irrespective of second group property information stored in a second bit field. Accordingly, KSVs of devices of the same or similar first group, e.g. devices of the same manufacturer, may be grouped to simplify a search for a certain KSV.

According to an advantageous example, the controller is adapted to process as a sub group key selection vectors storing the same or similar first group property information in the first bit field and storing the same or similar second group property information in the second bit field. Accordingly, a group may be divided into subgroups enabling grouping KSVS, e.g. in a tree structure, to increase search efficiency.

According to an embodiment, a digital content output device for an HDCP system is provided which is adapted to use a key selection vector structured as described above. Accordingly, a structured key selection vector may be stored in a digital content output device increasing the efficiency of KSV handling in the HDCP system.

According to an embodiment, a method for processing an above described structured key selection vector for a revocation list comprises processing as a group the plurality of key selection vectors storing the same or similar group property information in the at least one bit field. Accordingly, a key selection vector can be found more quickly in a search.

According to an advantageous example, the method further comprises the steps of receiving a revocation list containing at least one key selection vector, determining whether the received at least one key selection vector of the revocation list is stored in a memory, and discarding all data of the revocation list except the at least one key selection vector, if it is not stored in the memory.

According to an advantageous example, the method comprises processing as a group key selection vectors storing the same or similar first group property information in a first bit field irrespective of second group property information stored in a second bit field, and processing as a sub group key selection vectors storing the same or similar first group property information in the first bit field and storing the same or similar second group property information in the second bit field.

According to an embodiment, a revocation list for use in an HDCP system comprises at least one key selection vector structured as described above.

According to another embodiment, a computer program product is provided, which when loaded into a program memory of a processor or microcontroller, causes the processor or microcontroller to carry out at least one of the methods described above.

DETAILED DESCRIPTION OF THE PREFERRED EMBODIMENTS

Preferred embodiments of the invention are described with reference to the figures. It is noted that the following description contains examples only and should not be construed as limiting the invention.

Figure 1A:
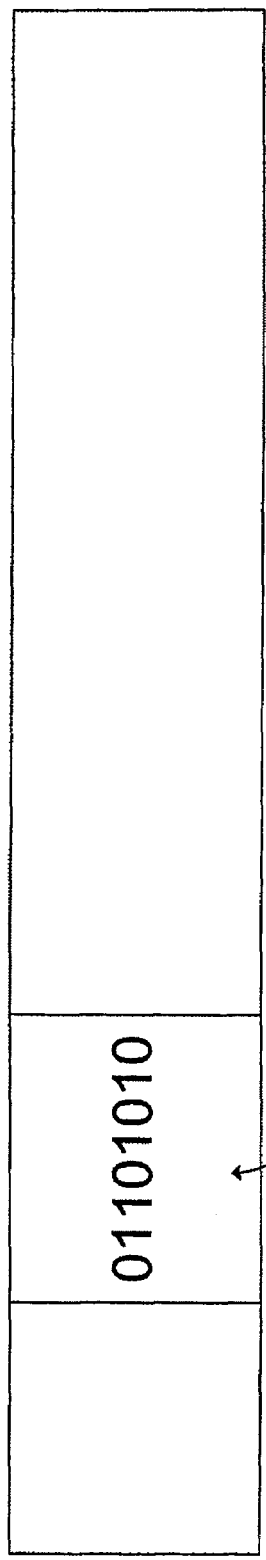
FIG. 1a illustrates a key selection vector according to an embodiment of the invention.

FIG. 1a illustrates a key selection vector (KSV) 100 for a revocation list, which may be used in a high-bandwidth digital content protection (HDCP) system to indicate that a certain device is to be revoked, e.g. that a certain sink device is not provided with digital content. KSVs and the HDCP system have been described above and are defined in detail in the above referenced HDCP specification. A KSV as defined in the HDCP specification comprises in total 40 bits and may be regarded as a bit string of 40 bits forming a series of bits.

The key selection vector 100 of FIG. 1a is structured to contain a bit field 110. The bit field 110 comprises a predetermined number of bits, e.g. 8 bits in the example of FIG. 1a. The bit field 110 is placed at a predetermined location in the KSV 100.

In this example, the bit field 110 with 8 bits may be represented by the ninth to sixteenth bit of the series of 40 bits of the KSV 100. Thus, the location of the bit field 110 in the KSV 100 may be defined by the positions of the 40 bits of the KSV 100.

The number of bits is clearly not limited to 8 but any other number may be used for the length of a bit field 110 depending on the information that should be contained in the bit field 110. Further, also the location of the bit field 110 may be chosen differently, however, the bit field 110 should be placed for the KSVs at the same predetermined location so that its information may be found easily at the same location and be compared to other KSVs.

The bit field 110 contains information relating to a group property of a device. The group property of a device can identify the device, such as a digital content output device, e.g. a LCD TV, by at least one of its manufacturer, model, batch, for example. The group property thus represents a property of a device that this device may have in common with another device, e.g. two devices were produced by the same manufacturer. Accordingly, the group property allows to process as a group a plurality of key selection vectors storing the same or similar group property information in the bit field 110.

Regarding the example of FIG. 1a, all KSVs with a bit field at the same location and with a bit pattern of the 8 bits "01101010" may be grouped together to form a group.

Alternatively or additionally, also a plurality of key selection vectors storing similar group property information in the bit field 110 may be processed as a group. For example, it may be defined that grouping is to be allowed of KSVs storing bit patterns in the bit field, in which only the last or first 6 bits are the same or in which a certain percentage of bits are the same. It is further possible to define that similar group property information is also group property information of bit fields, in which the checksum of the bit fields are the same, for example. Therefore, several requirements for similar group property information may be defined and grouping may not be limited to identical bit patterns.

According to the above, the group property allows to process as a group a plurality of KSVs according to the group property information contained in the bit field 110. Generally speaking, a structure is introduced in a key selection vector so that the KSV may be used more efficiently in the HDCP system.

As described above, the stored group property information may be used to not only identify individual devices but may identify a manufacturer, model or batch the device belongs to.

For example, a structured KSV can be assigned to a group by using the group property information to speed up a search for a certain KSV of a sink device among a plurality of key selection vectors stored on the source device.

In detail, as described above, the source device stores a plurality of KSVs of at least one revocation list and receives a KSV of the sink device when executing the authentication protocol in HDCP. To determine whether it is allowed to provide digital content to the sink device, the source device has to check whether the received KSV of the sink device is included in the plurality of KSVs obtained from at least one revocation list. If the KSVs stored on the source device are grouped according to their group property information, checking whether a match for the received KSV exists in the stored KSVs may be quickly performed by only searching in the group of KSVs having the same or similar group property information in the bit field as the received KSV.

In the above described examples with respect to FIG. 1a, only one bit field in the KSV has been described. However, as can be seen in FIG. 1b, the KSV 100' may also be structured to contain two bit fields 110, 120 or more.

For example, at least one bit field contains group property information indicating at least one of a manufacturer identity, model identity, batch identity and unit identity. For example, one bit field may contain group property information indicating a manufacturer identity and a model identity or model identity and unit identity or any other combination of the above described four identities or only one identity.

Further, a KSV may be structured to contain four bit fields, wherein the first one indicates the manufacturer identity, the second one indicates the model identity, the third one indicates the batch identity and the fourth one indicates a unit identity. A corresponding example will be described below with respect to FIG. 2a.

Figure 1B:
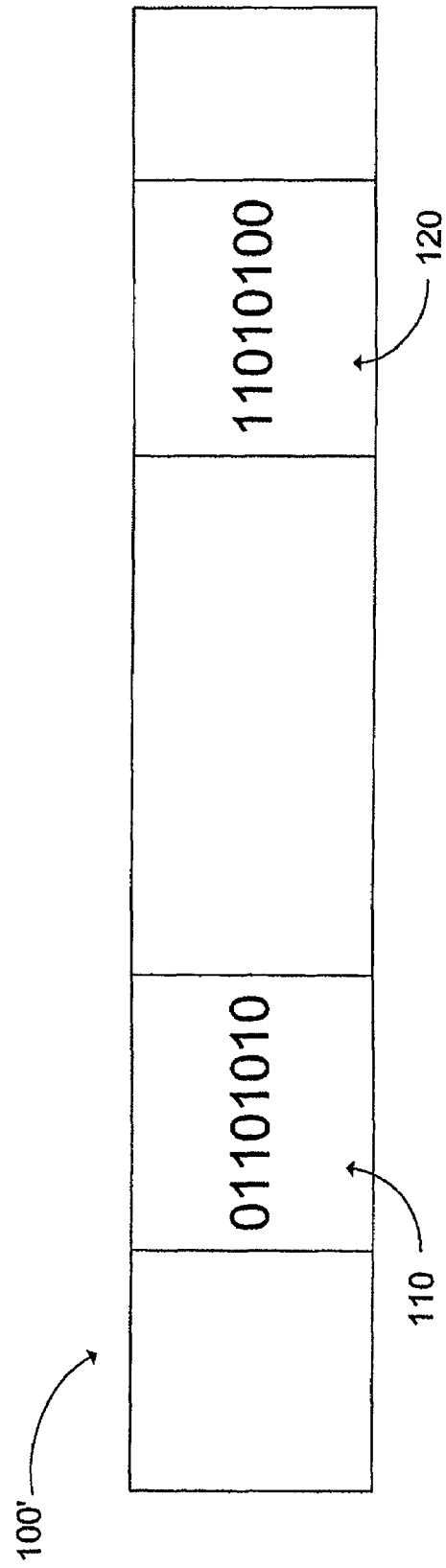
FIG. 1b illustrates a key selection vector according to another embodiment of the invention.

In the example of FIG. 1b, the first bit field 110 contains the same group property information as the bit field 110 in FIG. 1a, i.e. the bit pattern "01101010". This indicates for example that the KSV 100 and the KSV 100' are associated with devices having the same group property, e.g. devices of the same manufacturer. Additionally, the KSV 100' comprises the second bit field 120 in FIG. 1b containing a second bit pattern, which may define the model, batch or unit identity of the device associated with the KSV 100'.

Generally speaking, the key selection vector 100' includes a first 110 and a second bit field 120 containing information relating to a first group property of a device and a second group property of the device, respectively. This allows processing as a group key selection vectors storing the same or similar first group property information irrespective of their second group property information. For example, it is possible to define a group of KSVs, in which all KSVs have the same bit pattern "01101010" in the first bit field and having different bit patterns in the second bit field.

However, the second group property information in the second bit field also allows processing as a sub group key selection vectors storing the same or similar first group property information in the first bit field, as described above, and storing the same or similar second group property information in the second bit field. Therefore, the previously defined group may be further divided into sub groups, namely sub groups each having KSVs with the same bit pattern in the second bit field. For example, the KSV 100' in FIG. 1b belongs to the sub group of KSVs each containing the bit pattern "01101010" as first group property information in the first bit field and the bit pattern "11010100" as second group property information in the second bit field.

Defining groups and sub groups not only leads to a structure for easily sorting and storing KSVs, such as a tree structure, but other advantages may be achieved. For example, since all KSVs in a group have the same bit pattern in the first bit field, the bit pattern of the first bit field does not have to be stored for all KSVs in the group. It should be sufficient if the bit pattern, e.g. "01101010" of bit field 110 in FIG. 1b is stored once in the group, so that all KSVs of that group can be stored reduced by this bit pattern thus reducing storage space needed for the KSVs of that group.

Figure 2A:
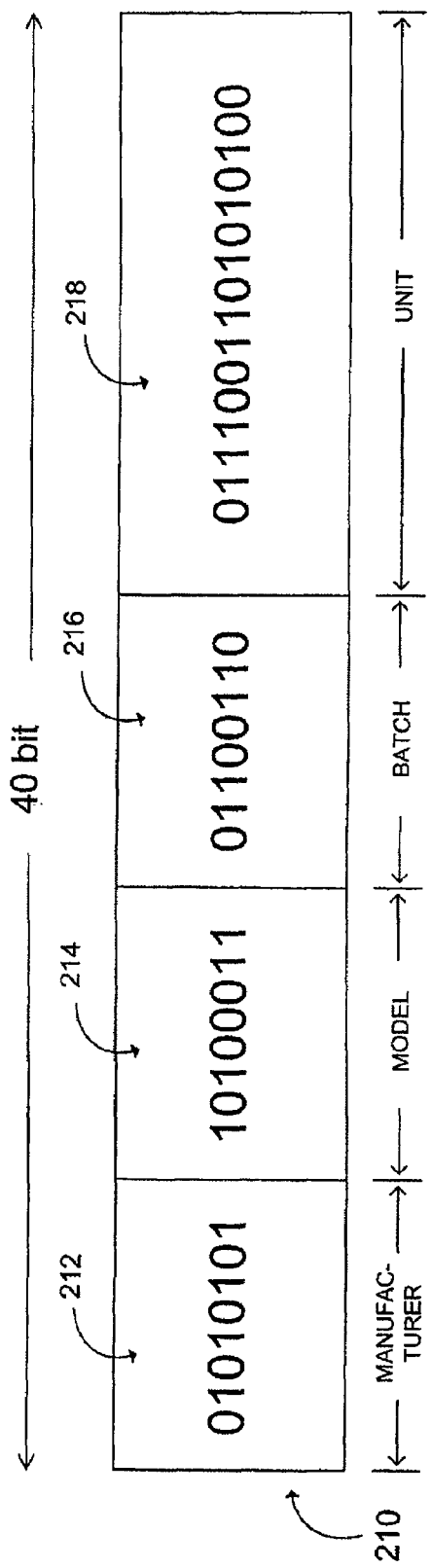
FIG. 2a illustrates an example of a key selection vector having four bit fields.

In FIG. 2a, a specific example of a KSV 210 including four bit fields 212, 214, 216, 218 containing information relating to a first to a fourth group property of a device, respectively, is presented. The first bit pattern constitutes first group property information to identify a manufacturer, the second bit pattern constitutes second group property information to identify a model, the third bit pattern constitutes third group property information to identify a batch and the fourth bit pattern constitutes fourth group property information to identify a unit.

A manufacturer identity may be a predetermined bit pattern in a predetermined bit field, for example the first bit field, assigned to a certain manufacturer X so that each device of manufacturer X has an associated KSV with the same bit pattern in the first bit field representing the identity of manufacturer X. Similar to manufacturer identity, model identity may define devices of the same model, such as a certain LCD TV model Y. The model identity may also be combined with the manufacturer identity so that the group property information may indicate a certain model of a certain manufacturer using one or two bit fields. The batch identity indicates a certain batch, e.g. all devices that have been manufacturer in a certain factory on a specific day, and the unit identity indicates an individual device. Using all four identities, the KSV may be structured to define the manufacturer of the device, the model of the device, the batch in which the device has been manufactured and the individual unit number of the device.

Similar to the above, a group of key selection vectors may be defined storing the same first group property information, e.g. in FIG. 2a the bit pattern "01010101". Further, the KSVs with the same first bit pattern may be divided into sub groups according to the second bit pattern. In other words, in the example of FIG. 2a, the group of KSVs of devices of the same manufacturer X comprises sub groups corresponding to different models Y1 to Yn of this manufacturer.

Furthermore, the sub groups may be further divided into sub subgroups, wherein a sub subgroup comprises KSVs with the same third bit pattern, e.g. "01100110" in bit field 216 in FIG. 2a, and different fourth bit patterns indicating that different devices with different unit identifiers have the same third group property, namely belong to the same batch, e.g. have been manufactured at the same factory and/or at the same time interval.

In this example, 8 bits are used to identify a manufacturer, 8 bits are used to identify a model, 8 bits are used to identify a batch, and 16 bits are used to identify a unit. It is noted that the length of the different bit fields may also be different and also a fifth or even more bit fields may be used.

Further, in this example, the tree structure comprises a group with several sub groups, wherein each sub group may comprise several sub subgroups and a sub subgroup may comprise KSVs associated with devices of the same manufacturer, of the same model and of the same batch.

For example, when using a tree structure having groups, sub groups and sub subgroups, it may be sufficient to store only the unit identifier corresponding to the fourth bit pattern in the fourth bit field 218 in the sub subgroup, since the tree structure and the grouping already define the information contained in the first to third bit fields. Therefore, in the example of FIG. 2a, a KSV stored in the sub subgroup may be reduced to 16 bits, namely it should be sufficient to only store the 16 bits of the unit identifier of the fourth bit field.

Further, even if full KSVs are stored in sub subgroups, a match to a received KSV of a sink device may be quickly found, since in a first step the first bit pattern identifying the manufacturer can be searched, in the second step, the second bit pattern identifying the model can be searched, in the third step the third bit pattern indentifying the batch can be searched and in the fourth step the fourth bit pattern indentifying the unit may be searched so that models of other manufacturers do not have to be considered in the search and similarly batches of other models of the same manufacturer also do not have to be considered in the search, etc.

In the above example, a tree structure for grouping and searching has been considered. However, as known in the art, other search algorithms exist that may be used to quickly compare a received KSV of a sink device with a plurality of stored KSVs of a revocation list in a source device.

As discussed above, a first bit field may contain a first predetermined bit pattern relating to a predetermined first group property of a device, for example the first group property may relate to devices of the same manufacturer, for example the manufacturer corresponding to the bit pattern "01010101" in FIG. 2a.

However, a second bit field may contain a second predetermined bit pattern not indicating a specific model, batch or unit, etc., but indicating that all devices of the predetermined first group property related to the first predetermined bit pattern are to be revoked in an HDCP system irrespective of their second group property information. This is explained in more detail in the following with respect to FIG. 2b.

Figure 2B:
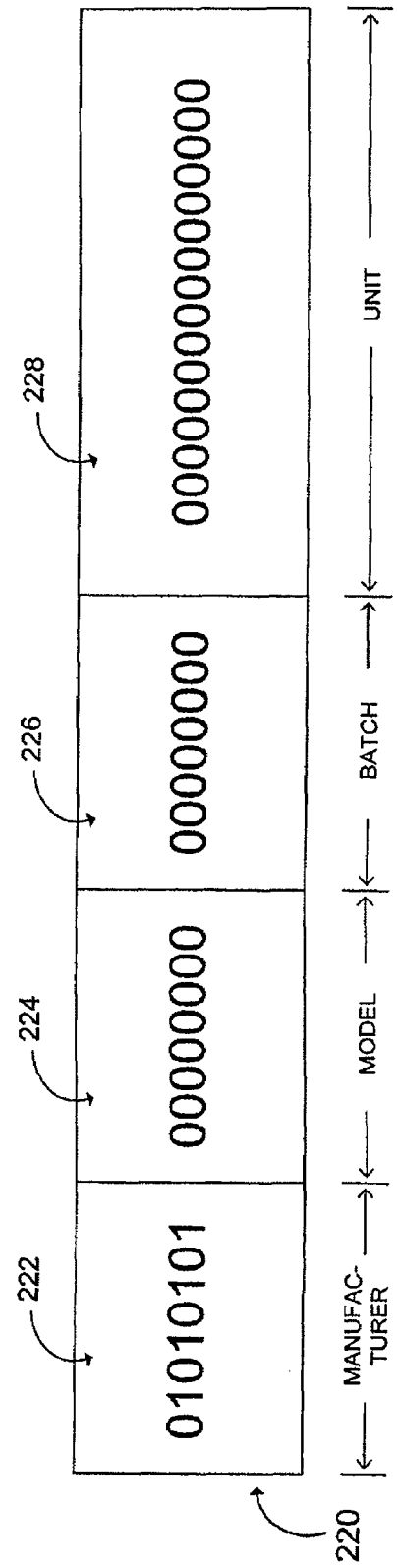
FIG. 2b illustrates another example of a key selection vector having four bit fields.

The KSV 220 of FIG. 2b is structured similarly to the KSV of FIG. 2a comprising four bit fields 222, 224, 226 and 228. Considering first for simplicity only the first two bit fields 222 and 224, the first bit field contains a bit pattern "01010101" which is the same as in the KSV 210 of FIG. 2a indicating a certain manufacturer X. However, the second bit field contains a second bit pattern with only zeros. Such a second bit pattern may be used to define that each model of the manufacturer X identified in the first bit field has to be revoked.

For example, if all devices of manufacturer X have to be revoked, i.e. all are not allowed to obtain digital content from the source device, one KSV stored in the source device may be sufficient to revoke all devices instead of storing a KSV for each sink device in the source device. Using the example of group, sub group and sub subgroup described above, a group may comprise only one KSV to indicate that all devices of the manufacturer X are to be revoked, if the second bit field contains a second predetermined bit pattern indicating such a revocation, for example by zeros as shown in FIG. 2b. Note that the second predetermined bit pattern is clearly not limited to only zeros but another bit pattern may be defined, such as a bit pattern only comprising ones.

Considering now all four bit fields in FIG. 2b, different levels of revocation may be introduced. In the above example, all devices of a manufacturer X may be revoked if the other (second) bit fields are all set to 0. In the example of FIG. 2b, this means that the second to fourth bit fields 224, 226 and 228 are set to 0.

Further, if it is desired to revoke all devices of a model Y of a manufacturer X, the third and fourth bit fields 226 and 228, respectively, may be set to 0. Still further, if all devices of a batch Z of a model Y of a manufacturer X are to be revoked, the fourth bit field 228 may be set to 0.

Finally, if no bit field is set to 0, this may indicate that the KSV relates to an individual device.

In the above example, four levels have been described, but it is noted that the number of levels may be completely arbitrary, i.e. larger or smaller than four, depending on the desired effect.

Therefore, by using the above described scheme with a structured KSV, the number of KSVs that have to be received and stored by a source device may be greatly reduced and a search for a certain KSV of a sink device in the stored KSVs may be much faster. For example, this allows identifying not only individual devices but also manufacturer, model, batch of production, etc., which makes it possible to revoke all devices of the same manufacturer without listing all KSVs of all individual devices produced by that manufacturer.

Note that a structured KSV with a bit field of zeros to indicate revocation of a manufacturer, model, etc. is not a unique device identifier anymore and thus it may be differentiated between a KSV of a revocation list that is stored on a source device and a KSV of a sink device, wherein the latter KSV still has to be an individual unique device identifier of the sink device.

Figure 3:
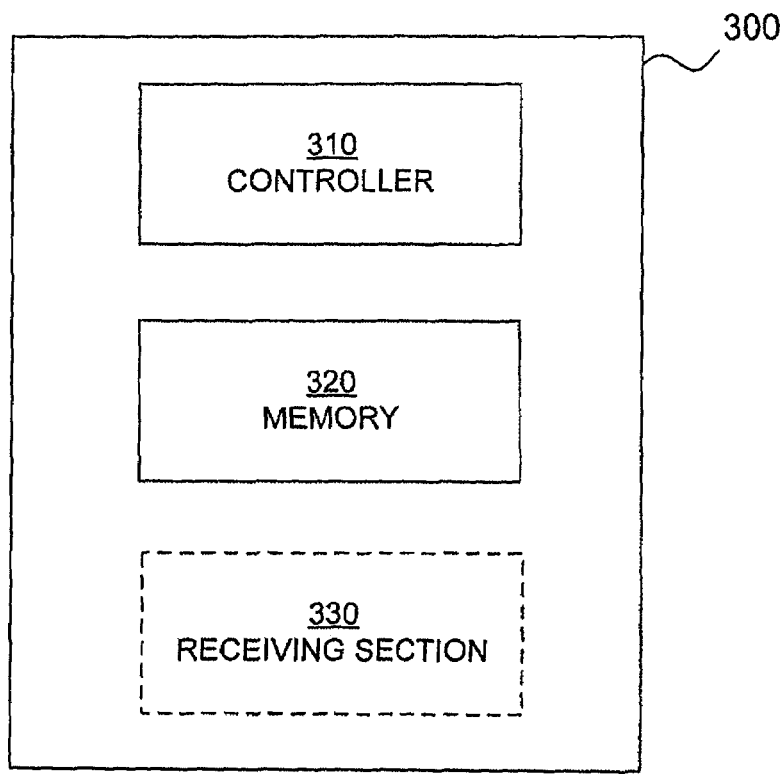
FIG. 3 illustrates elements of a mobile device according to an embodiment of the invention.

In the following, FIG. 3 illustrates elements of a mobile device 300 adapted to process a KSV for a revocation list, which is structured as discussed above.

The mobile device 300 comprises a controller 310 and a memory 320. Optionally, which is indicated by the dashed box, the mobile device 300 may also comprise a receiving section 330. A mobile device may be a mobile phone, such as a cellular phone or another small portable device with preferably a radio interface, such as a netbook or a personal digital assistant (PDA).

The controller 310 controls processing of key selection vectors in the mobile device. Further, the controller may comprise a processor, such as a central processing unit (CPU) for processing the key selection vectors. The memory 320 of the mobile device 300 is provided to store KSVs.

For example, the controller 310 is adapted to process a plurality of key selection vectors storing the same or similar group property information in at least one bit field as a group. Therefore, the controller 310 is aware of and specifically adapted to process the above described structured key selection vector. After processing, the key selection vector may be linked or stored in the memory 320 according to its group property information. For example, the memory may store different folders each corresponding to different group property information, for example to manufacturer X1, manufacturer X2, . . . , manufacturer Xn.

In an example considering a KSV with a first and a second bit field, the controller is adapted to process as a group key selection vectors storing the same or similar first group property information in the first bit field irrespective of second group property information stored in the second bit field. For example, if the first group property information relates to manufacturer X1, several KSVs of devices of the manufacturer X1 but with different second group property information may be stored in this folder.

Further, if KSVs with the same first group property information and the same second group property information exist, the controller may process as a subgroup KSVs storing the same group property information in the first bit field and storing the same second group property information in the second bit field. For example, this sub group may then constitute a sub folder in the folder manufacturer X1 comprising KSVs associated with devices of the same manufacturer X1 and the same model, for example model Y1.

Similar to the above, a KSV may be stored having a first bit field containing a first predetermined bit pattern relating to a predetermined first group property of a device and a second bit field containing a second predetermined bit pattern indicating that all devices of that predetermined first group property related to the first predetermined bit pattern are to be revoked in an HDCP system irrespective of their second group property information. For example, as described above, the second predetermined bit pattern may be a bit pattern comprising only zeros. Therefore, only one KSV has to be stored in the folder of the manufacturer X1, if all devices of the manufacturer X1 are to be revoked, wherein this KSV comprises a first predetermined bit pattern associated with manufacturer X1 and the other bit field or bit fields having zeros.

In an embodiment, the mobile device 300 comprises the receiving section 330 to receive a revocation list containing at least one key selection vector. It is noted that a KSV can also be received independent of a revocation list but the above referenced HDCP specification requires the KSV to be included in a revocation list, which, once distributed to the mobile device, is verified by checking its signature according to the HDCP specification.

Then, the controller determines whether a received KSV of the received revocation list is already stored in the memory of the mobile device so as to avoid storing of duplicates of KSVs. The controller discards all data of the revocation list, such as duplicate KSVs and header or other overhead data of the revocation list, except key selection vectors that are not stored in the memory, and arranges for storing the remaining KSVs.

The receiving section 330 preferably comprises at least one of a radio interface and a storage medium readout device to receive a KSV of a revocation list either wirelessly from an external device or from a storage medium contained or connected to the mobile device 300.

For example, the receiving section 330 is capable of obtaining the revocation list from a storage medium, such as the memory 320 or a connectable flash memory or SIM card of a mobile phone, on which the revocation list may be stored. The storage medium may also comprise a Blu-ray disc, if the mobile device is adapted to receive such discs. A revocation list or lists may be stored on a storage medium, such as the memory 320 or a SIM card, during production of the mobile device or may be stored during a firmware upgrade. Further, several possibilities exist to transmit a revocation list to a mobile device, e.g. by wire, such as connecting to a computer from time to time, or wirelessly, for example when a media file is received at the mobile device, which may have the revocation list embedded in it.

Further, a mobile network operator may update the revocation list from time to time using a bearer independent protocol.

In the following, a method for processing a key selection vector structured as described above is described with respect to FIG. 4. This method may be carried out in a mobile device, such as the mobile device 300 described above.

Figure 4:
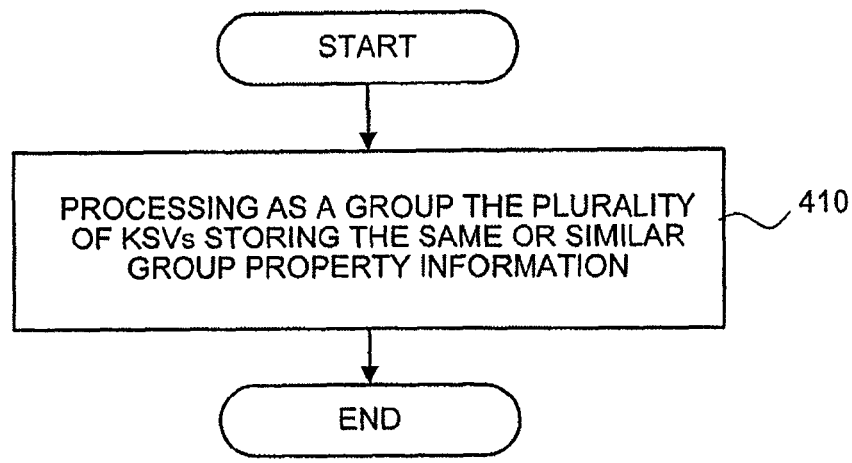
FIG. 4 illustrates a method for processing a key selection vector according to an embodiment of the invention.

In detail, FIG. 4 shows a flow diagram, wherein in step 410, when starting operations, KSVs storing the same or similar group property information are processed as a group. For example, the KSVs to be processed have previously been received in a revocation list, which is then processed to be able to efficiently store KSVs and to be able to later search for a specific KSV in the stored KSVs.

In the following, communications between a mobile device 530 and a digital content output device 500 are described with respect to FIG. 5.

Similar to the mobile device 300, the mobile device 530 comprises the controller 310, the memory 320 and the receiving section 330, which function as described above. Further, the mobile device 530 comprises a communication section 540 to communicate with the digital content output device 500.

The digital content output device 500 comprises a display 510, such as an LCD display or a CRT display, and a speaker 520. Further, which is not shown, the digital content output device 500 may comprise a communicating section to communicate with the communicating section 540 of the mobile device. The digital content output device of FIG. 5 is an example of a sink device, which has been mentioned above.

Figure 5:
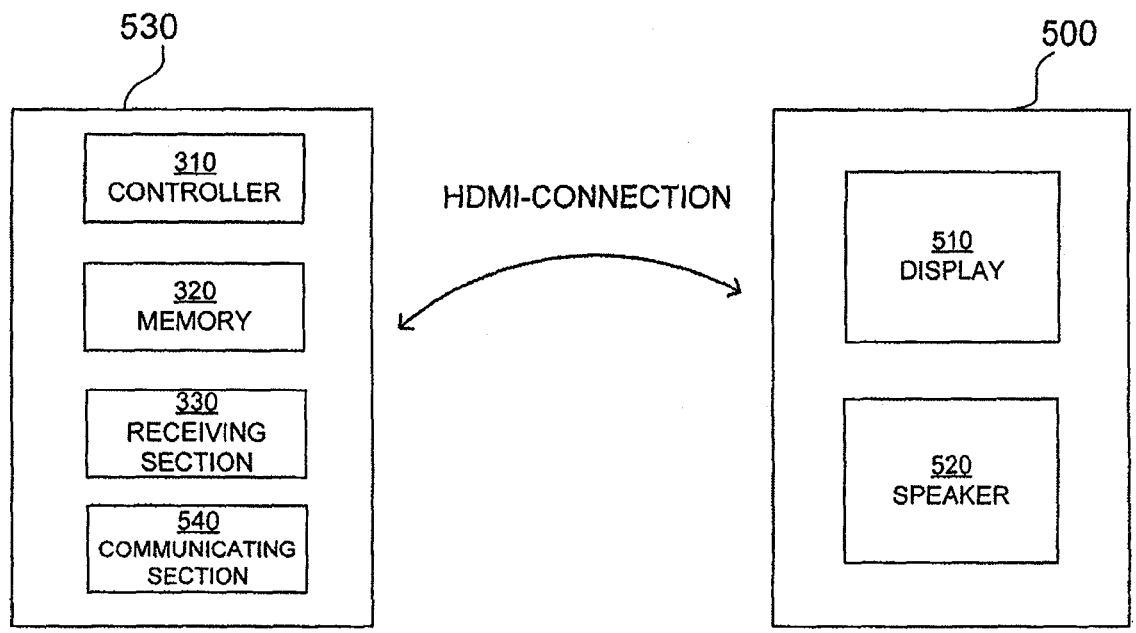
FIG. 5 illustrates a mobile device and a digital content output device according to an embodiment of the invention.

In detail, the mobile device 530, which is a source device in FIG. 5, may communicate with the digital content output device 500 by wire or wirelessly. For example, a HDMI cable may be connected between the two devices to establish a HDMI connection to transfer digital content. However, when starting the authentication protocol of the above referenced HDCP specification, the mobile device 530 receives the KSV of the digital content output device 500 and first checks whether a device with this KSV is allowed to receive digital content. Therefore, the controller 310 executes a search in the KSVs stored in the mobile device 530 for a match with the received KSV of the digital content output device 500. This procedure has been described in detail above and it is referred to the above description to avoid unnecessary repetition.

Once the authentication procedure is completed, and the digital content output device 500 is not revoked, digital content, such as audio/visual content may be provided to the digital content output device 500 via a HDMI connection, such as the above described HDMI cable.

It may also be feasible to combine HDMI and wireless LAN or Bluetooth so that a wireless HDMI connection is enabled. The digital content may then be received by the communicating section of the sink device 500 and high definition video may be output by the display 510.

In the following, operations of methods for processing a structured key selection vector for a revocation list are described with respect to FIGS. 6 and 7.

Figure 6:
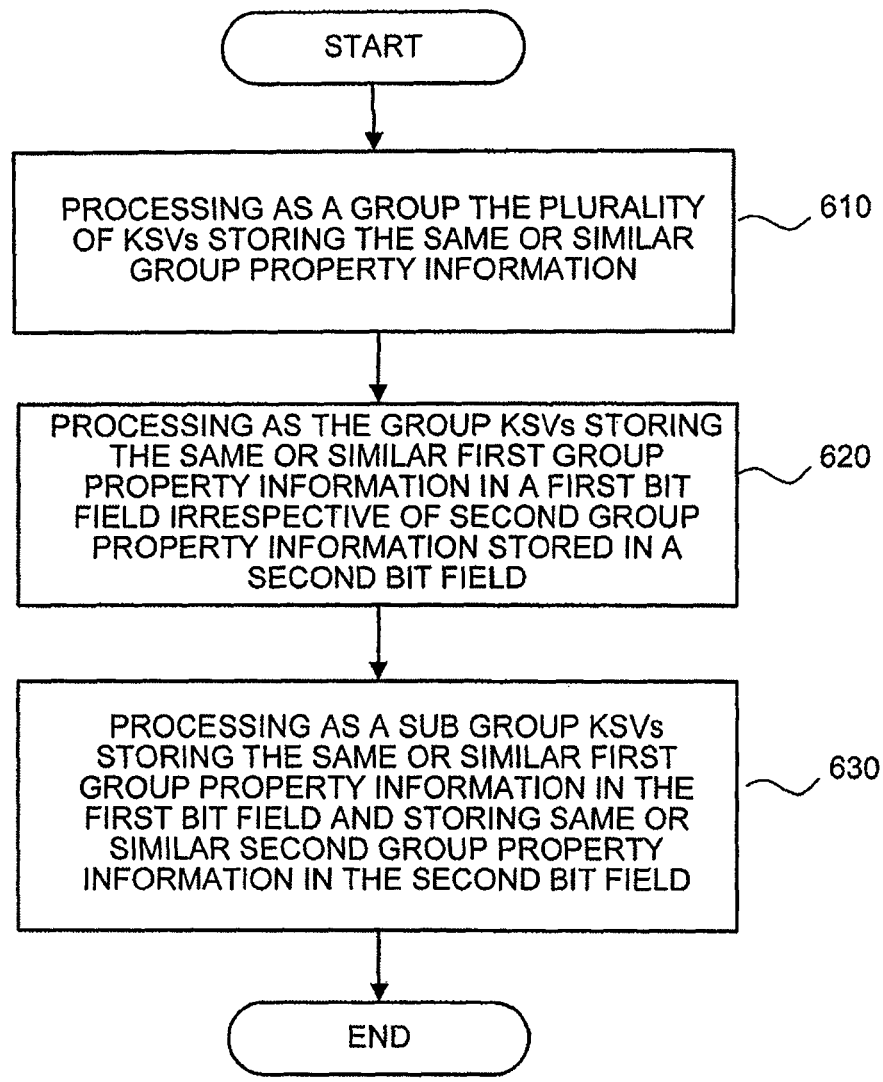
FIG. 6 illustrates a method for processing a key selection vector according to an embodiment of the invention, in particular including processing key selection vectors as a group and as a sub group.

In particular, FIG. 6 illustrates operations of a method for processing key selection vectors as a group and as a sub group, wherein groups and sub groups have been described above.

In detail, in step 610 a plurality of KSVs storing the same or similar group property information in the first bit field are processed as a group. This step is basically the same as step 410 of FIG. 4.

Then, if a second bit field exists, further processing steps, such as step 620 and 630 may performed.

For example, in step 620, the KSVs storing the same or similar first group property information in the first bit field are all processed as the group irrespective of their second group property information stored in the second bit field.

Then, in step 630, the KSVs storing the same or similar first group property information in the first bit field and storing the same or similar second group property information in the second bit field are processed as a sub group. For example, referring back to FIG. 2a, the KSVs of the sub group may have the same first group property information, such as the bit pattern "01010101" and the same second group property information, such as the bit pattern "10100011" in the second bit field. Accordingly, a tree structure may be defined, as described above.

Figure 7:
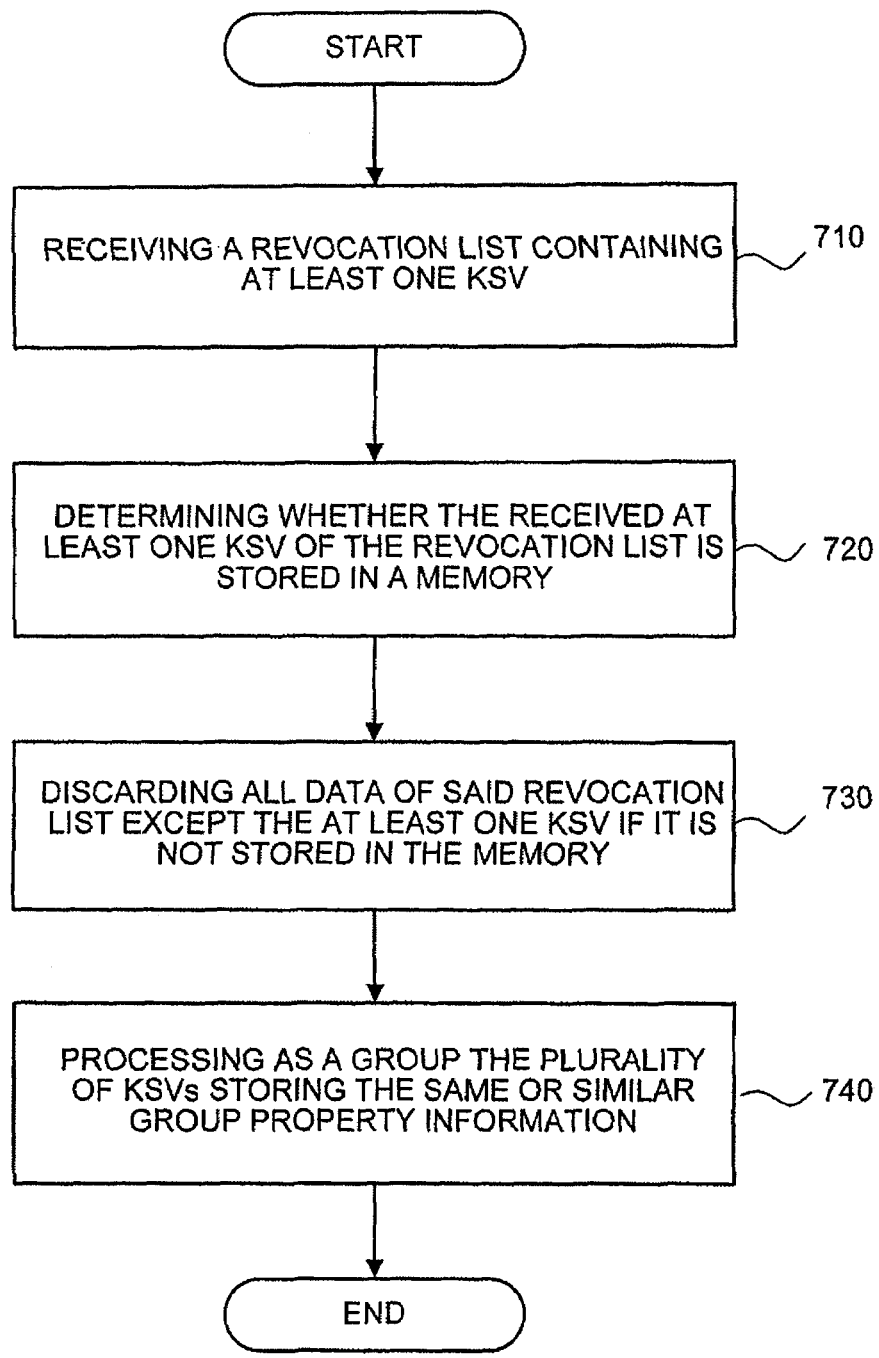
FIG. 7 illustrates a method for processing a key selection vector according to another embodiment of the invention, in particular including a key selection vector received from a revocation list.

In FIG. 7, a method is illustrated, in particular describing processing KSVs after reception by a mobile device, such as the mobile device 300 or 530.

In detail, in step 710 a revocation list containing at least one KSV is received. Generally, a revocation list is used in a HDCP system, which comprises at least one key selection vector. As described above, it may be useful to not store the revocation list and its content without any processing in a memory of the mobile device.

Therefore, in step 720 it is determined whether the received at least one KSV of the revocation list is already stored in the memory of the mobile device. If it is found that this KSV is already stored, the KSV is discarded, which is described in step 730. In step 730, all data of the revocation list, such as header data, and already stored KSVs are discarded.

Therefore, it can be ensured that the KSVs in the memory are updated without duplication and memory is not wasted.

In the next step 740, the received KSVs of the revocation list, and optionally also the already stored KSVs, if desired or needed, which all store the same or similar group property information, are processed as a group. Therefore, the KSVs may be stored in a structured way so that when a KSV is received from a sink device, it may be easily checked whether there is a match to this KSV in the memory storing the KSVs that indicate revocation.

As described above, the mobile device 300 and mobile device 530 of FIGS. 3 and 5, respectively, comprise the controller 310 and the memory 320.

As known by the skilled person, the functions of the controller may be realized by a hardware arrangement, for example, comprising hard wired circuits or ASCIs (application specific integrated circuits) or software or any suitable combination of the above.

For example, the functions of the controller including a processor may be realized by running suitable software that may be stored in the memory 320. Accordingly, several functions of the mobile device may be integrated and carried out by one processor.

As described above, the controller 310 is incorporated in the mobile device and connected to a memory, e.g. the memory 320 such as a RAM, ROM, hard disk, (E)EPROM, a disk, a flash memory or a suitable combination thereof. For example, a program code stored in the memory 320 may be a software program including instructions adapted to cause the processor of the controller to carry out the above described method steps and functions.

In other words, a program may be provided including instructions adapted to cause a processor, such as the processor of the controller 310, to carry out combinations of the above described method steps.

Moreover, a computer readable medium may be provided in which the program is embodied. The computer readable medium may be tangible, such as a disk or other data carrier, or may be intangible, constituted by signals suitable for electronic, optic or any other type of transmission. A computer program product might comprise the computer readable medium and when loaded into a program memory of a computer, processor or microcontroller causes the processor or microcontroller to carry out the above described operations.

It will be appreciated that various modifications and variations can be made in the described key selection vectors, devices and methods as well as in the construction of this invention without departing from the scope or spirit of the invention.

The invention has been described in relation to particular embodiments which are intended in all aspects to be illustrative rather than restrictive. Those skilled in the art will appreciate that many different combinations of hardware, software and firmware will be suitable for practicing the invention.

Moreover, other implementations of the invention will be apparent to the skilled person from consideration of the specification and practice of the invention disclosed herein. It is intended that the specification and the examples be considered as exemplary only. To this end, it is to be understood that inventive aspects lie in less than all features for the single foregoing disclosed implementation or configuration. Thus, the true scope and spirit of the invention is indicated by the following claims.

The invention claimed is:

1. A non-transitory storage medium storing computer readable instructions and a key selection vector for a revocation list in a high-bandwidth digital content protection (HDCP) system, wherein the computer readable instructions are executable by a processor to perform a method comprising:
accessing the key selection vector containing at least one bit field with a predetermined number of bits and at a predetermined location in the key selection vector, wherein the bit field contains a first predetermined bit pattern relating to a group property of a device,
identifying a plurality of key selection vectors storing same or similar group property information in said at least one bit field,
wherein the key selection vector for the revocation list contains at least another bit field containing a second predetermined bit pattern which indicates that the key selection vector identifies said plurality of key selection vectors which are associated with a plurality of different devices,
wherein the first predetermined bit pattern is included in a first bit field containing information relating to a first group property of a device and the key selection vector includes a second bit field containing information relating to a second group property of the device, and
processing as a group key selection vectors storing same or similar first group property information irrespective of their second group property information.

2. The non-transitory storage medium of claim 1, wherein the key selection vector is assigned to said group using said group property information to speed up a search for a key selection vector among a plurality of key selection vectors.

3. The non-transitory storage medium of claim 1, wherein the at least one bit field contains group property information indicating at least one of a manufacturer identity, model identity, batch identity and unit identity.

4. The non-transitory storage medium of claim 1, further comprising processing as a sub group of key selection vectors storing the same or similar first group property information in the first bit field and storing same or similar second group property information in the second bit field.

5. The non-transitory storage medium of claim 4, wherein the first predetermined bit pattern relates to a predetermined first group property of a device and the second predetermined bit pattern indicates that all devices of said predetermined first group property related to said first predetermined bit pattern are to be revoked in an HDCP system irrespective of their second group property information.

6. A digital content output device for an HDCP system adapted to use the non-transitory storage medium storing the computer readable instructions and the key selection vector according to claim 1.

7. The non-transitory storage medium of claim 1, wherein a revocation list for use in an HDCP system is stored on the non-transitory storage medium.

8. A mobile device adapted to process a key selection vector for a revocation list, comprising:
a controller to control processing of key selection vectors in the mobile device, the controller being configured to selectively process as a group, based on a received key selection vector for a revocation list, a plurality of key selection vectors storing the same or similar group property information in the at least one bit field; and
a memory to store key selection vectors;
wherein:
the received key selection vector is structured to contain at least one bit field with a predetermined number of bits and at a predetermined location in the received key selection vector,
the bit field contains a first predetermined bit pattern relating to a group property of a device, which group property allows to process as a group a plurality of key selection vectors storing the same or similar group property information in said at least one bit field, said plurality of key selection vectors being associated with a plurality of different devices, and
the key selection vector for the revocation list contains at least another bit field containing a second predetermined bit pattern which indicates that the key selection vector identifies said plurality of key selection vectors which are associated with a plurality of different devices,
a receiving section to receive the revocation list containing the at least one key selection vector;

wherein the controller is adapted to determine whether said received at least one key selection vector of said revocation list is stored in the memory and to discard all data of said revocation list except said at least one key selection vector if it is not stored in said memory.

9. The mobile device of claim 8, wherein
said receiving section is configured to receive said revocation list from at least one of: a storage medium having said revocation list stored in it, a media file having said revocation list embedded in it, and a firmware upgrade.

10. The mobile device of claim 8, wherein said controller is adapted to process as a group the plurality of key selection vectors storing the same or similar group property information in the at least one bit field.

11. The mobile device of claim 10, wherein
said controller is adapted to process as a group key selection vectors storing same or similar first group property information in the first predetermined bit pattern irrespective of second group property information stored in the second predetermined bit pattern.

12. The mobile device of claim 11, wherein
said controller is adapted to process as a sub group key selection vectors storing the same or similar first group property information in the first predetermined bit pattern and storing same or similar second group property information in the second predetermined bit pattern.

13. A method for processing a key selection vector for a revocation list by a mobile device including a processor, the method comprising the steps of:
receiving a revocation list containing at least one key selection vector, the at least one key selection vector structured to contain at least one bit field with a predetermined number of bits and at a predetermined location in the key selection vector;
wherein the bit field contains a first predetermined bit pattern relating to a group property of a device, which group property allows to process as a group a plurality of key selection vectors storing the same or similar group property information in said at least one bit field, said plurality of key selection vectors being associated with a plurality of different devices; and
wherein the key selection vector for the revocation list contains at least another bit field containing a second predetermined bit pattern which indicates that the key selection vector identifies said plurality of key selection vectors which are associated with a plurality of different devices; and
selectively processing as a group, based on the key selection vector in the revocation list, the plurality of key selection vectors storing the same or similar group property information in the at least one bit field using the processor;
determining whether said received at least one key selection vector of said revocation list is stored in a memory; and
discarding all data of said revocation list except said at least one key selection vector if it is not stored in said memory.

14. The method of claim 13, further comprising the step
processing as a group key selection vectors storing same or similar first group property information in a first bit field irrespective of second group property information stored in a second bit field; and
processing as a sub group key selection vectors storing the same or similar first group property information in the first bit field and storing same or similar second group property information in the second bit field.

15. A non-transitory storage medium storing a computer program product, which when loaded into program memory of a processor or microcontroller, causes the processor or microcontroller to carry out a method of claim 13.

* * * * *